No. 715,933. Patented Dec. 16, 1902.
W. P. ALLEN.
ROTARY ENGINE.
(Application filed June 19, 1902.)
(No Model.)
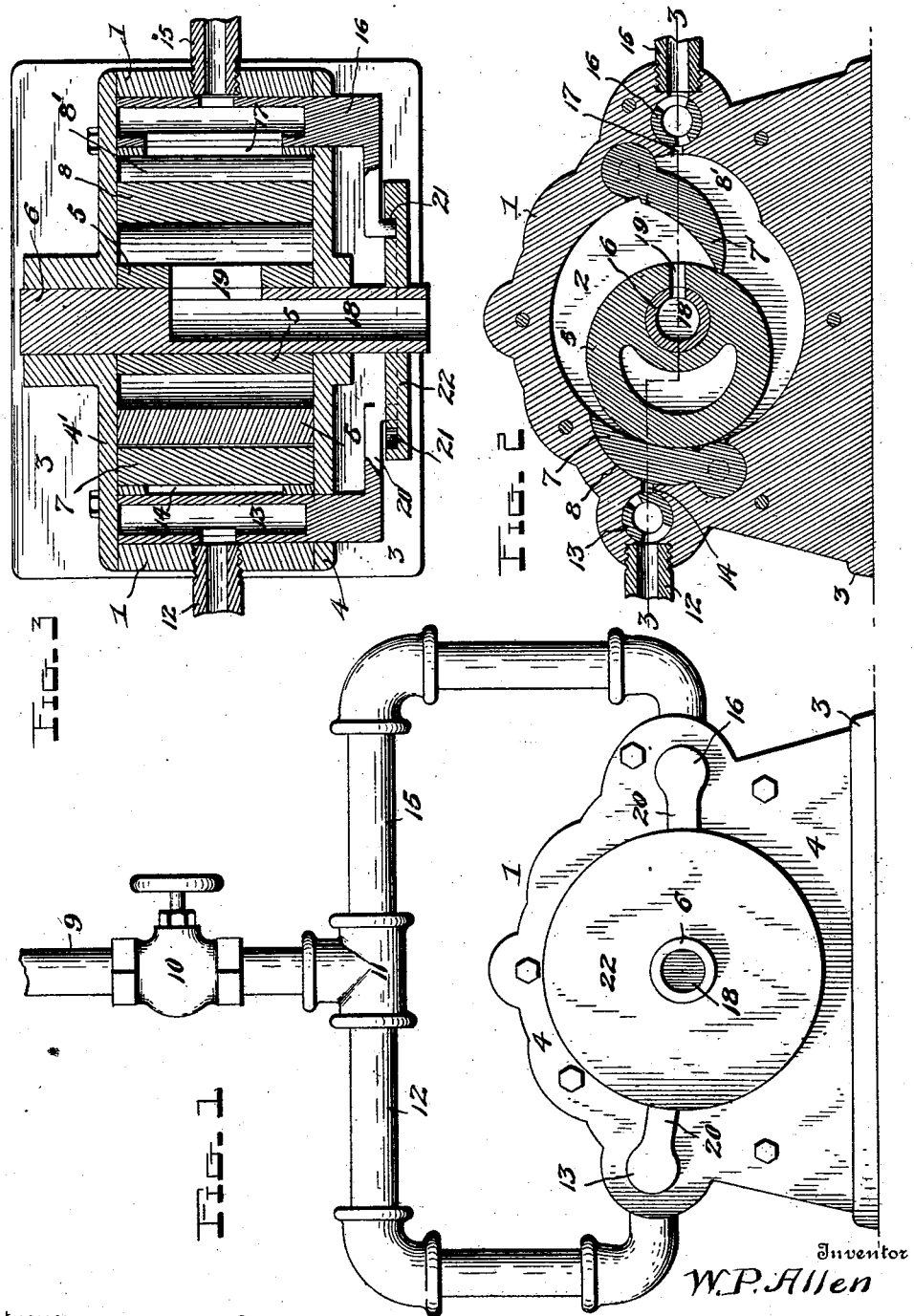
Inventor
W. P. Allen
By H. B. Willson & Co.
Attorneys
Witnesses

UNITED STATES PATENT OFFICE.

WILLIAM P. ALLEN, OF HAWESVILLE, KENTUCKY, ASSIGNOR, BY MESNE ASSIGNMENTS, OF ONE-HALF TO CHARLES W. COOK, OF EVANSVILLE, INDIANA.

ROTARY ENGINE.

SPECIFICATION forming part of Letters Patent No. 715,933, dated December 16, 1902.

Application filed June 19, 1902. Serial No. 112,300. (No model.)

*To all whom it may concern:*

Be it known that I, WILLIAM P. ALLEN, a citizen of the United States, residing at Hawesville, in the county of Hancock and State of Kentucky, have invented certain new and useful Improvements in Rotary Engines; and I do declare the following to be a full, clear, and exact description of the invention, such as will enable others skilled in the art to which it appertains to make and use the same.

My invention relates to rotary engines of the eccentric-piston type.

The object of the invention is to provide an engine of this character which shall be simple and durable in construction and very efficient in operation.

With the above and other objects in view, which will readily appear as the nature of the invention is better understood, said invention consists in certain novel features of construction and combination and arrangement of parts, which will be hereinafter fully described and claimed, and illustrated in the accompanying drawings, in which—

Figure 1 is a side elevation of an engine embodying my invention. Fig. 2 is a central vertical longitudinal section of the same. Fig. 3 is a horizontal section on the line 3 3 of Fig. 2.

Referring to the figures on the drawings, 1 designates a casing in which is formed the cylinder 2 and which is provided with a suitable base 3. The ends of the cylinder are closed by the plates or heads 4 and 4', secured to the casing by bolts or screws. The piston 5, which is mounted eccentrically in the cylinder on the shaft 6, journaled in the heads 4 4', is adapted to close or force the pivoted wings 7 7' into their seats 8 8' as it rotates.

9 designates the steam-supply pipe, provided with the controlling-valve 10 and branched at 11. One branch pipe 12 leads to the cylindrical valve 13, mounted in the casing 1 at one side of the cylinder and adapted to communicate with the inlet-port 14, which opens into the cylinder directly in rear of the wing 7. The other branch pipe 15 leads to a similar valve 16 in the casing on the opposite side of the cylinder and when properly operated is adapted to communicate with the cylinder through the port 17, which opens into the same directly in rear of the wing 7'. A portion of the shaft 6 from the center of the cylinder to one end is hollowed, as shown at 18. The inner end of the hollow portion or passage 18 communicates with the cylinder through an exhaust-port 19, and the outer end is open to the atmosphere to allow the exhaust-steam to escape. The valves 13 and 16, which supply steam to the cylinder, are worked in alternation and may be actuated by any desired mechanism. That illustrated in the drawings consists in having the ends of the valves project through the head or plate 4 and providing them with crank-arms 20, the ends of which run in the cam or eccentric groove or slot 21 in the disk 22, secured to one end of the shaft 6. As the disk is rotated with the shaft the ends of the crank-arms will move in the cam-groove and gradually rock the valves 13 and 16 alternately to an open and closed position.

The operation of the engine is as follows: As shown in Fig. 2, the valve 13 is closed and the wing 7 is forced into its seat by the piston 5 and the valve 16 is open and supplying steam to the cylinder below the wing 7'. As the cylinder-space above the wing 7' is in communication with the exhaust-port 19, the pressure of the steam below said wing upon the piston will force it around to the right or in the direction of the arrow. This movement will bring the exhaust-port 19 around in communication with the space below the wing 7', and at the same time the valve 16 will close and the valve 13 begin to open. The pressure of the steam back of the wing 7 will force it out against the piston, and the steam will enter the cylinder-space above the said wing and force the piston around. It continues to rotate under the pressure until the exhaust-port 19 comes into communication with the space above the wing 7, by which time the valves will again reverse and the parts will assume a position already described.

It will be seen that my engine may be easily converted into a powerful rotary pump by reversing the direction of rotation of the piston and providing the cylinder with the proper inlet and outlet connections.

From the foregoing description, taken in connection with the accompanying drawings, it is thought that the construction, mode of operation, and advantages of my improved rotary engine will be readily apparent without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

In a rotary engine, the combination with a cylinder formed in a casing having its ends closed by suitable heads or plates and having inlet-ports at diametrically opposite points, of a hollow shaft journaled in said heads, serving as an exhaust for the cylinder, an eccentric piston mounted upon said shaft, wings pivoted at diametrically opposite points in the cylinder in advance of the inlet-ports and adapted to be closed by said piston and opened by the steam from said inlet-ports, cylindrical steam-inlet valves adapted to alternately communicate with said inlet-ports, and means for alternately actuating said valves, consisting of a disk provided with a cam-groove carried by said shaft and crank-arms carried by said valves and adapted to operate in the cam-groove in said disk, substantially as specified.

In testimony whereof I have hereunto set my hand in presence of two subscribing witnesses.

WILLIAM P. ALLEN.

Witnesses:
D. L. ADAIR,
W. S. THOMAS.